(12) United States Patent
Sarajlic et al.

(10) Patent No.: US 11,252,591 B2
(45) Date of Patent: Feb. 15, 2022

(54) HIGH FREQUENCY WIRELESS COMMUNICATION NETWORK

(71) Applicant: Telefonaktiebolaget LM Ericsson (publ), Stockholm (SE)

(72) Inventors: Muris Sarajlic, Malmö (SE); Joao Vieira, Hjärup (SE); Niklas Wernersson, Kungsängen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/416,606

(22) Filed: May 20, 2019

(65) Prior Publication Data

US 2020/0374724 A1    Nov. 26, 2020

(51) Int. Cl.
*H04W 24/10* (2009.01)
*H04L 5/00* (2006.01)
*H04L 27/26* (2006.01)

(52) U.S. Cl.
CPC .......... *H04W 24/10* (2013.01); *H04L 5/0048* (2013.01); *H04L 27/2605* (2013.01)

(58) Field of Classification Search
CPC ... H04W 24/10; H04L 5/0048; H04L 27/2605
See application file for complete search history.

(56) References Cited

U.S. PATENT DOCUMENTS

| | | | |
|---|---|---|---|
| 10,164,814 B1 * | 12/2018 | Zhou | H04L 27/265 |
| 2009/0180559 A1 * | 7/2009 | Hsu | H04L 25/0222 375/260 |
| 2012/0076038 A1 * | 3/2012 | Shan | H04B 7/024 370/252 |
| 2012/0307704 A1 * | 12/2012 | Roman | H04W 56/004 370/312 |
| 2015/0282123 A1 * | 10/2015 | Miao | H04L 5/0051 455/450 |
| 2016/0167186 A1 * | 6/2016 | Chan | B25F 5/00 173/2 |
| 2018/0062811 A1 * | 3/2018 | Akkarakaran | H04L 25/0222 |
| 2018/0167186 A1 * | 6/2018 | Shao | H04L 5/0048 |
| 2018/0323918 A1 | 11/2018 | Chuang et al. | |
| 2018/0331872 A1 | 11/2018 | Manolakos et al. | |
| 2019/0013978 A1 | 1/2019 | Zhou et al. | |
| 2019/0081832 A1 * | 3/2019 | Marinier | H04L 5/0053 |
| 2019/0288808 A1 * | 9/2019 | Baldemair | H04W 72/0446 |

FOREIGN PATENT DOCUMENTS

WO    2013154334 A1    10/2013

OTHER PUBLICATIONS

International Search Report and Written Opinion dated Jul. 27, 2020, for Application No. PCT/SE2020/050421 filed on Apr. 27, 2020,consisting of 12-pages.

* cited by examiner

*Primary Examiner* — Duc C Ho

(74) *Attorney, Agent, or Firm* — Christopher & Weisberg, P.A.

(57) ABSTRACT

There is disclosed a method of operating a measuring radio node in a wireless communication network, the method includes transmitting signaling based on delay spread information, the delay spread information being based on and/or representing delay spread associated to received reference signaling. There are also disclosed related devices and method.

11 Claims, 7 Drawing Sheets

HIGH FREQUENCY WIRELESS COMMUNICATION NETWORK

TECHNICAL FIELD

This disclosure pertains to wireless communication technology, in particular for high frequencies.

BACKGROUND

For future wireless communication systems, use of higher frequencies are considered, which allow large bandwidths to be used for communication. However, the use of such higher frequencies brings new problems, e.g. regarding physical properties and timing.

SUMMARY

It is an object of this disclosure to provide improved approaches of handling wireless communication, in particular in regard to handling delay spread of signaling and/or timing. The approaches are particularly suitable for millimeter wave communication, in particular for radio carrier frequencies around and/or above 52.6 GHz, which may be considered high radio frequencies. The radio nodes and/or network described herein may operate in wideband, e.g. with a carrier bandwidth of 1 GHz or more, or 2 GHz or more, or even larger. In some cases, operation may be based on an OFDM waveform or a SC-FDM waveform (e.g., downlink and/or uplink). However, operation based on a single carrier waveform, e.g. SC-FDE, may be considered for downlink and/or uplink. In general, different waveforms may be used for different communication directions.

The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution. However, the approaches may also be used with other RAT, for example future 5.5G or 6G systems or IEEE based systems.

There is described a method of operating a measuring radio node in a wireless communication network. The method comprises transmitting signaling based on delay spread information, the delay spread information being based on and/or representing delay spread associated to received reference signaling.

There is also disclosed a measuring radio node for a wireless communication network. The measuring radio node is adapted to transmit signaling and/or receive signaling based on delay spread information, the delay spread information being based on and/or representing delay spread associated to received reference signaling. The measuring radio node may comprise, and/or be adapted to utilize, processing circuitry and/or radio circuitry, in particular a transmitter and/or receiver and/or transceiver, for transmitting signaling, and/or receiving signaling, and/or measuring delay spread and/or determining the delay spread information.

The measuring radio node may be implemented as a terminal or wireless device or user equipment (UE), or in some cases as a network node. Transmitting signaling may be in uplink if the measuring radio node is a wireless device, or in downlink if it is a network node. A measuring radio node in general may be adapted to determine delay spread information based on measurement/s.

Further, a method of operating a radio node in a wireless communication network is described. The method comprises communicating with a measuring radio node based on a measurement report representing delay spread information received from the measuring radio node.

There is also proposed a radio node for a wireless communication network. The radio node is adapted to communicate with a measuring radio node based on a measurement report representing delay spread information received from the measuring radio node. The radio node may comprise, and/or be adapted to utilize, processing circuitry and/or radio circuitry, in particular a transmitter and/or receiver and/or transceiver, for transmitting signaling like the reference signaling, and/or receiving signaling like the measurement report, and/or measuring delay spread and/or determining the delay spread information.

Communicating with a measuring radio node may comprise, based on the measurement report, scheduling transmission to and/or from a measuring radio node and/or for one or more channels, and/or performing beam forming (e.g., reception beam forming and/or transmission beam forming) for communication with the measuring radio node, and/or performing link adaptation (e.g., adapting a MCS) for communication with the measuring radio node, and/or changing and/or adapting and/or configuring bandwidth and/or bandwidth part and/or numerology for communication with the measuring radio node.

The approaches herein allow recognizing potential issues associated with radio propagation channels yielding large delay spreads, and to adapt the communication between measuring node and network node accordingly. Accordingly, orthogonality and/or synchronization properties of received signaling may be maintained and/or improved even for signaling with very short time base, e.g. for high bandwidth with short symbol time interval.

Alternatively, or additionally, there may be considered a method of operating a measuring radio node in a wireless communication network, the method comprising determining delay spread information based on received reference signaling. A measuring radio node for a wireless communication network may be considered, wherein the measuring radio node may be adapted to determine delay spread information based on received reference signaling, wherein the measuring radio node may comprise, and/or be adapted to utilize, processing circuitry and/or radio circuitry, in particular a receiver and/or transceiver and/or transmitter, for determining the delay spread information. Delay spread information may in general be determined based on a measurement configuration and/or reference signaling configuration. A method of operating a radio node in a wireless communication network may be considered, the method comprising transmitting reference signaling, which may be reference signaling for delay spread determination by a measuring radio node receiving the reference signaling. A radio node is for a wireless communication network is also described, the radio node being adapted to transmit reference signaling, which may be reference signaling for delay spread determination by a measuring radio node receiving the reference signaling. The radio node may comprise, and/or be adapted to utilize, processing circuitry and/or radio circuitry, in particular a transmitter and/or transceiver and/or receiver, to transmit the reference signaling and/or to configure the measuring radio node with a measurement configuration and/or a reference signaling configuration pertaining to the reference signaling.

Signaling transmitted based on delay spread information may comprise a measurement report representing the delay spread information. Alternatively, or additionally, the measuring radio node may be adapted to adapt its own communication based on the delay spread information. Thus, the network may be informed about delay spread affecting communication and compensate for it, and/or the measuring radio node may compensate itself.

It may be considered that a measurement report representing the delay spread information is a channel state information, CSI, report. The report may be transmitted on a PUCCH or PUSCH (or an analogous sidelink channel). Thus, existing infrastructure may be adapted to include the delay spread information or a representation thereof. It may be considered that the measurement report representing delay spread information is appended and/or included into a CSI report, e.g. a CSI report part 2.

Delay spread information and/or a measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be a distribution over time/delay, e.g. of received power and/or energy of a signal. A range may indicate an interval of the delay spread distribution over time/delay, which may cover a predetermined percentage of the delay spread respective received energy or power, e.g. 50% or more, 75% or more, 90% or more, or 100%. A relative delay spread may indicate a relation to a threshold delay, e.g. of the mean delay, and/or a shift relative to an expected and/or configured timing, e.g. a timing at which the signaling would have been expected based on the scheduling, and/or a relation to a cyclic prefix duration (which may be considered on form of a threshold). Energy distribution or power distribution may pertain to the energy or power received over the time interval of the delay spread. Power delay profile may pertain representations of the received signals, or the received signals energy/power, across time/delay. Power delay profile related parameters may pertain metrics computed from the power delay profile. Different values and forms of delay spread information and/or report may be used, allowing a wide range of capabilities. The kind of information represented by a measurement report may be predefined, or be configured or configurable, e.g. with a measurement configuration and/or reference signaling configuration, in particular with higher layer signaling like RRC or MAC signaling and/or physical layer signaling like DCI signaling.

In some variants, a measurement report is dependent on, and/or represents, whether the delay spread, e.g. parametrized by a mean delay or main delay, or a power delay profile related parameters, reaches a delay threshold, e.g. if it is larger or at most at the threshold, or whether it is smaller. The report may include one or more bits (e.g., a flag or bit field) indicating the threshold is reached. This may be based on a mean delay compared to a delay threshold or cyclic prefix.

It may be considered that a measurement report is dependent on, and/or represents, whether a characteristic of a time distribution of received signaling reaches a distribution threshold or not. It may be dependent on and/or represent one or more characteristics, or whether one or more characteristics reaches a threshold or not. Example characteristics comprise and/or may pertain to delay spread, mean delay, delay range, energy distribution, power distribution, power delay profile, power delay profile related parameters, or combinations thereof. A distribution threshold may pertain to a value of a characteristic, considered that the delay spread is distributed over time. For example, it may be considered that a measurement report indicates, e.g. with a flag (a flag may be considered a bit field carrying 1 bit only) or a bit field, whether one or more peaks in energy and/or power occurred, e.g. within a time interval around the mean delay, or outside of such a time interval. A peak may be determined based on a corresponding threshold being reached or not.

It may be considered that the reference signaling covers two symbol time intervals, e.g. according to the numerology used. The reference signaling may comprise reference signaling structures indicating for each subcarrier that carries reference signaling a structure of two adjacent symbols of the reference signaling. A muted or zero-point symbol may be considered part of the structure if it is configured accordingly and/or is neighboring and/or adjacent to a symbol carrying reference signaling. Accordingly, a delay spread even for high bandwidths may be covers, allowing measuring of the complete impulse response.

The measurement report may pertain to a plurality of beams, and/or indicate relative delay spread between beams, and/or may provide a list and/or order of preferred beams based on delay spread properties, and/or power delay profile associated parameters. Thus, complex and/or dynamic beamforming environments may be addressed/managed.

It may be considered that the reference signaling comprises Channel State Information, CSI, reference signaling and/or a corresponding signaling structure or sequence. However, other forms of reference signaling may be considered, e.g. SRS for uplink transmission, or a new form of reference signaling.

It may be considered that the reference signaling comprises signaling with a prolonged cyclic prefix. The prolonged cyclic prefix may have a duration of N times the duration of the normal cyclic prefix used for the numerology the communication (e.g., downlink in the 3GPP NR standard) operates on. This may be particularly useful in the context of having a long reference symbol, e.g. covering two or more symbols (including the prolonged cyclic prefix as leading part). Thus, the impulse response may be covered particularly well.

There is also considered a program product comprising instructions adapted for causing processing circuitry to control and/or perform a method as described herein, as well as a carrier medium arrangement carrying and/or storing such a program product.

The measuring radio node generally may be adapted to perform measurements on the reference signaling to determine the delay spread information and/or the measurement report. Measurements may be performed based on a measurement configuration and/or a reference signaling configuration. The measurement configuration may be included in the reference signaling configuration or vice versa. A measurement configuration may generally indicate how to perform measurements, e.g. when (timing) and/or how often and/or with which resolution and/or with which constraints and/or on which frequency spectrum, and/or how and/or when to report, e.g. how to determine the measurement report. A reference signaling configuration may generally indicate characteristics pertaining to the reference signaling, on which the measurements are to be performed on, e.g. based on the measurement configuration. Characteristics may include reference signaling structure and/or sequence and/or resources and/or timing, etc.

A measurement report being dependent on a condition may be considered to indicate that the form of the measurement report is dependent on the condition, and/or that the measurement report is transmitted or not based on whether the condition is fulfilled. The form of the measurement report may for example indicate how many and/or which bits or bit fields are to be transmitted. For example, some bit fields may be omitted if a threshold value for one or more characteristics is not reached. A measurement report may be transmitted separately, e.g. including only information representing delay spread information, or together with other information, e.g. measurement information and/or control information, e.g. UCI (Uplink Control Information like Ack-Nack, SR, etc.)

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
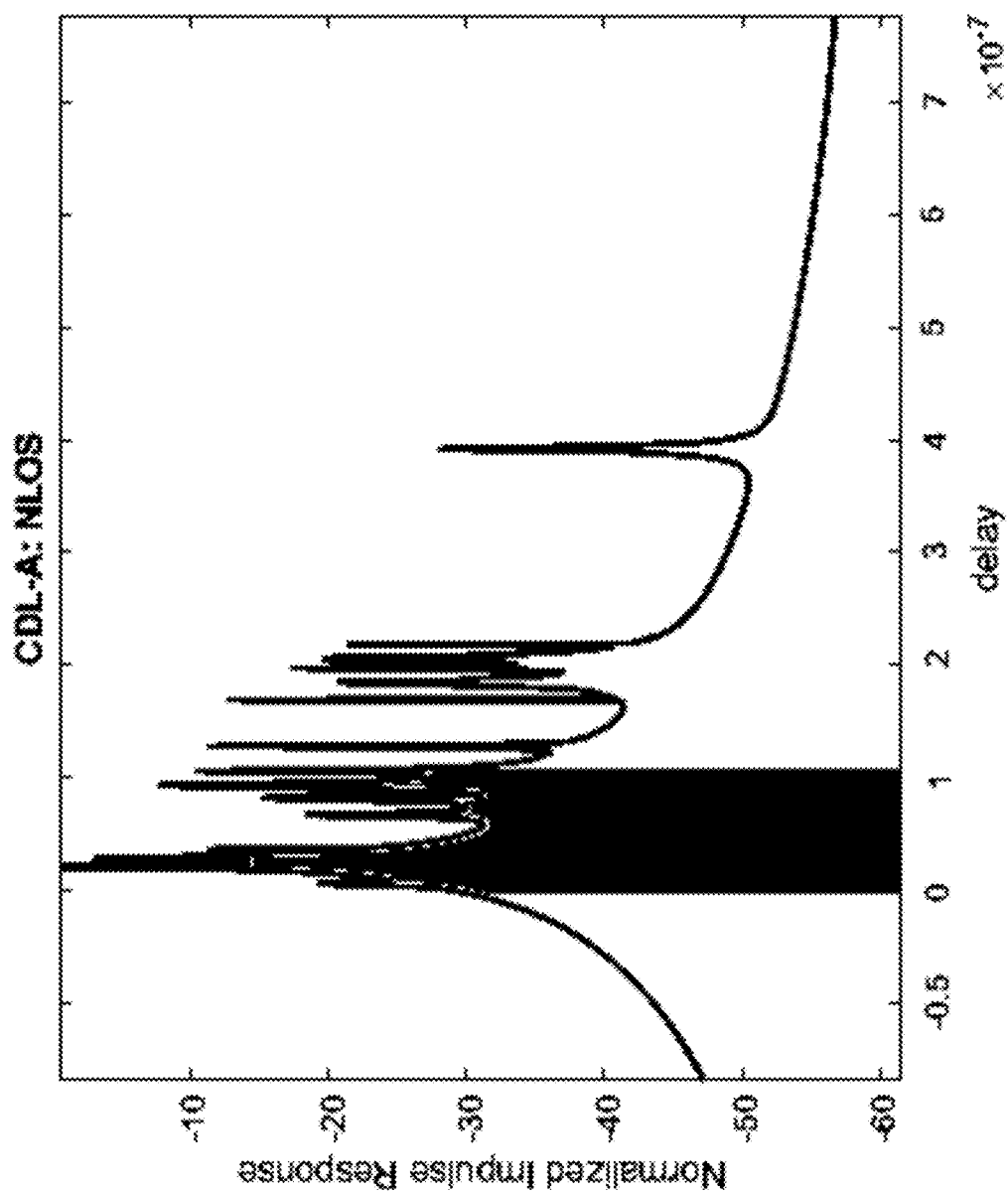
FIG. 1, showing an exemplary impulse response to a signal relative to a cyclic prefix.

In general, radio signaling propagating through a space in a propagation channel may undergo different effects distorting the signal. Some of these effects can lead to a signal being spread out in time and/or being delayed, e.g. delay dispersion, and/or multi-path, if a signal travels between a transmitter and receiver via multiple paths, which may represent different propagation channels with different effects on the signaling, which might add up for a receiver. This can lead to the signal being spread out over time, e.g. having increased or shifted (relative to a delay expected from pure traveling time of light across a path) mean or main delay and a large delay spread or delay distribution. In general, delay spread information may be considered to represent a time distribution of signaling, in particular of received signaling. Delay spread may be considered to be represented by delay spread information. Delay spread information may indicate and/or represent a parametrization of such a time distribution and/or delay and/or delay spread, in particular mean delay or main delay and/or a delay distribution. A delay distribution (also referred to as, or represented by, delay spread) may for example indicate in which delay interval around the mean delay or main delay a certain percentage of the signal or energy of the signal is distributed, e.g. one of, or more than, 50% or 75% or 90%. The delay spread is associated to the impulse response of a propagation channel, a response or output a receiver provides to specific received signaling without other signaling interfering. A delay spread may generally be considered to correspond a distribution over time, e.g. of energy and/or power of a signal, and/or may correspond to an impulse response. A mean delay may be determined based on the delay spread distribution.

In many wireless communication systems, in particular such based on OFDM waveform or SC-FDM waveforms, cyclic prefixes are used in signaling. A cyclic prefix is a repetition of the end of a signal added to the beginning of a signal. A cyclic prefix allows a receiver to be robust against time delays (e.g., from multiple sources or multiple-path effects) and/or loss of orthogonalization of signals. However, if the delay spread of signaling (or a sufficiently large percentage thereof) is larger in time domain than the cyclic prefix, synchronization and/or orthogonalization properties may be lost. This is not a problem for most systems operating in carrier frequencies below, as the typical delay spreads are smaller than the cyclic prefixes used, even though cyclic prefixes typically are significantly shorter than a symbol time interval to limit signaling overhead. With the introduction of high carrier frequencies, increasingly larger bandwidths may be used for signaling. For example, in 5G, carrier bandwidths are usually limited to 100 MHz or several 100 MHz, whereas for high frequencies bandwidths of 1 GHz or 2 GHz or even more are considered. With increasing bandwidth, the associated symbol time interval in a numerology will decrease, and, accordingly, cyclic prefixes will be shorter as well. Delay spread for signaling at these frequencies, at least for example for a beam and/or one path and/or for delay dispersion, may be independent or largely independent to the carrier frequency, or at least do not follow the timing of symbols and cyclic prefixes proportionally. Thus, for high carrier frequencies, e.g. mm-wave carrier frequencies, the delay spread of signaling may increasingly be larger than the cyclic prefix duration. This can lead to loss of orthogonality between subcarriers and/or temporal interference between adjacent OFDM symbols.

FIG. 1 shows an example of a normalized impulse response covering several $10^{-7}$ s. The impulse response is measured approximately across 1.3 GHz of bandwidth. OFDM signaling operating with such bandwidth would yield 144-samples CP lengths of about $1 \times 10^{-7}$ s. As can be seen, the cyclic prefix in this example cover $1 \times 10^{-7}$ s, between 0 and 1 on the delay axis, which corresponds to a (144-samples) short cyclic prefix associated with a high frequency carrier/numerology. A significant part of the impulse response lies outside the cyclic prefix, which will lead to the above mentioned issues with the signaling. It should be noted that the cyclic prefix for NR systems currently typically is above 1 microsecond, which would cover the whole impulse response.

Figure 2:
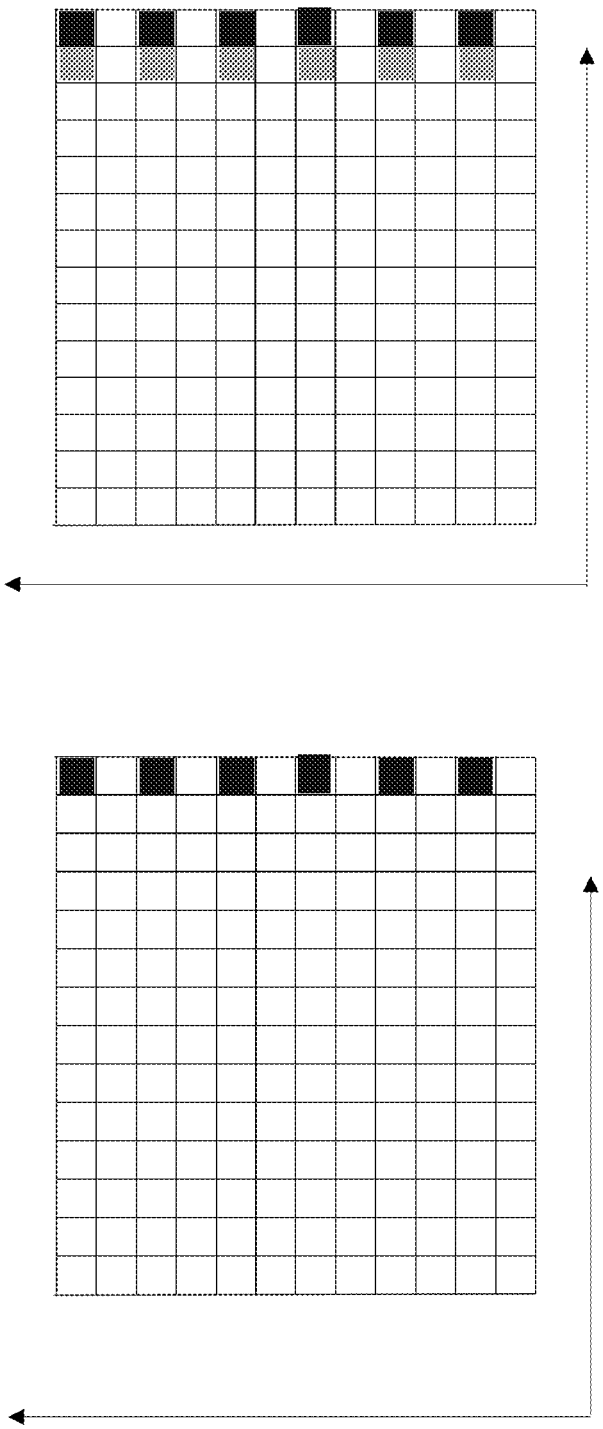
FIG. 2, showing exemplary reference signaling.

FIG. 2 shows exemplary reference signaling in a resource grid, e.g. a slot grid for NR. The x-axis represents time, each block in the grid corresponds to one symbol time interval. The y-axis represents frequency, each block corresponds to one subcarrier. Accordingly, each block represents one resource element. The grids shown to the left and to the right each represent one physical resource block, 12 subcarriers, in a slot with 14 symbols. Other time/frequency structures may be considered, in particular if instead of OFDM/SC-FDM, another waveform is considered, e.g. a single carrier waveform like a SC-DFE waveform. In the examples shown in FIG. 2, the dark resource elements may represent resource elements carrying reference signaling, e.g. CSI-RS or SRS or other forms of reference signaling. The reference signaling shown may cover 1 symbol in time (left) or two symbols (or even more symbols) in time (right), which may be neighboring and/or adjacent. The reference signaling may be located in different symbols of a slot than the last ones as exemplarily shown in FIG. 2. Differently colored symbols or resource elements on the same subcarrier may indicate different symbols on the resource elements (e.g., a zeroed element and a non-zeroed element, and/or shifted symbols), or the same symbol being repeated.

In general, a UE or measuring radio node may be configured with a reference signaling configuration, for example via control signaling, e.g. higher layer signaling like RRC signaling and/or MAC signaling, and/or physical layer signaling, e.g. DCI signaling. A reference signaling configuration may generally indicate resources for reference signaling, and/or a sequence (e.g., of modulation symbols), which may be mapped to the reference signaling resources of the indicated resources, and/or a cover code and/or cyclic shift to be applied to the sequence and/or resources, and/or the timing (e.g., on a slot or symbol level) of the reference signaling, and/or timing of providing a measurement report pertaining to the reference signaling and/or may indicate and/or may pertain to one or more beams, which may be transmission and/or reception beams. The measurement report may be periodic and/or semi-static, or aperiodic and/or dynamic, e.g. triggered by and/or in response to physical layer signaling, e.g. a scheduling grant or scheduling assignment.

Resources for reference signaling may be represented by a set of resources, which may include resources, in particular resource elements, intended to carry and/or carrying reference signaling and/or associated symbols (e.g., modulation symbols). A measuring radio node may perform measurement on the reference signaling, based on which measurement information may be determined, e.g. in the form of a measurement report. A measurement report may be transmitted to the network, e.g. a network node, e.g. based on the reference signaling and/or a measurement configuration and/or a reference signaling configuration and/or control signaling like DCI or SCI triggering the measurement and/or measurement report. Reference signaling may be arranged in frequency space in a comb structure, wherein between two subcarriers or resource blocks carrying reference signaling and/or a modulation symbol thereof, there is at least one subcarrier or resource block not carrying reference signaling, e.g. empty or muted, or carrying other signaling, for example data signaling or control signaling.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Measurement information may generally comprise information determined and/or derived based on measurement/s, e.g. by sampling and/or processing measured samples, for example combining and/or averaging and/or weighing and/or classifying (e.g., by comparing with a threshold) and/or adding and/or integrating and/or differentiating and/or performing one or more transformations and/or evaluations and/or estimations. A measurement report may comprise and/or represent and/or be based on measurement information. Measurement information may pertain to one or more beams, each of which may carry reference signaling, and/or may pertain to a beam at different times, e.g. when the beam is swept, and/or at different slots or transmission timing structures. The beams may be beams transmitted by a radio node, in particular a network node. Measurements may be performed based on one or more reception beams, or without. It may be considered that measurements are performed based on beam pairs, each beam pair comprising a transmission beam and a reception beam. A reception beam may be used by a measuring radio node for reception. A measurement report and/or measurement information may indicate a transmission beam and/or reception beam and/or beam pair used for measurement. The measuring radio node generally may be adapted to perform measurements on the reference signaling to determine the delay spread information and/or the measurement report. Measurements may be performed based on a measurement configuration and/or a reference signaling configuration. The measurement configuration may be included in the reference signaling configuration or vice versa. A measurement configuration may generally indicate how to perform measurements, e.g. when (timing) and/or how often and/or with which resolution and/or with which constraints and/or on which frequency spectrum, and/or how and/or when to report, e.g. how to determine the measurement report. A reference signaling configuration may generally indicate characteristics pertaining to the reference signaling, on which the measurements are to be performed on, e.g. based on the measurement configuration. Characteristics may include reference signaling structure and/or sequence and/or resources and/or timing, etc. A measurement report being dependent on a condition may be considered to indicate that the form of the measurement report is dependent on the condition, and/or that the measurement report is transmitted or not based on whether the condition is fulfilled. The form of the measurement report may for example indicate how many and/or which bits or bit fields are to be transmitted. For example, some bit fields may be omitted if a threshold value for one or more characteristics is not reached. A measurement report may be transmitted separately, e.g. including only information representing delay spread information, or together with other information, e.g. measurement information and/or control information, e.g. UCI (Uplink Control Information like Ack-Nack, SR, etc.)

In some cases, a measuring radio node may be adapted to operate based on measurement information, in particular transmit and/or receive based on measurement information. For example, it may adapt its transmission timing and/or beam forming (e.g., reception beam forming and/or transmission beam forming) based on measurement information and/or which information or data to transmit (e.g., from a buffer and/or one or more logical channels and/or associated to different bearers), for example to compensate for measured delay.

In some cases, a radio node may be adapted to communicate with a measuring radio node based on a received measurement report. Communicating based on a measurement report and/or delay spread information may for example comprise scheduling transmission to and/or from a measuring radio node and/or for one or more channels based on the report or information, and/or performing beam forming (e.g., reception beam forming and/or transmission beam forming) for communication based on the report or information, and/or performing link adaptation (e.g., adapting a MCS) based on the report or information, and/or changing and/or adapting and/or configuring bandwidth and/or bandwidth part and/or numerology based on the report or information. The communication may be between the measuring radio node and the radio node.

It may be considered that reference signaling cover in time one or more symbol time intervals, in particular two symbols, which may be adjacent in time. On each subcarrier carrying reference signaling, at least one of the symbol time intervals (respectively adjacent resource elements) may carry a non-zero point CSI-RS, and at least one a zero point CSI-RS (which may be muted). The non-zero point CSI-RS (also called CSI-RS) may lead in time.

Figure 3:
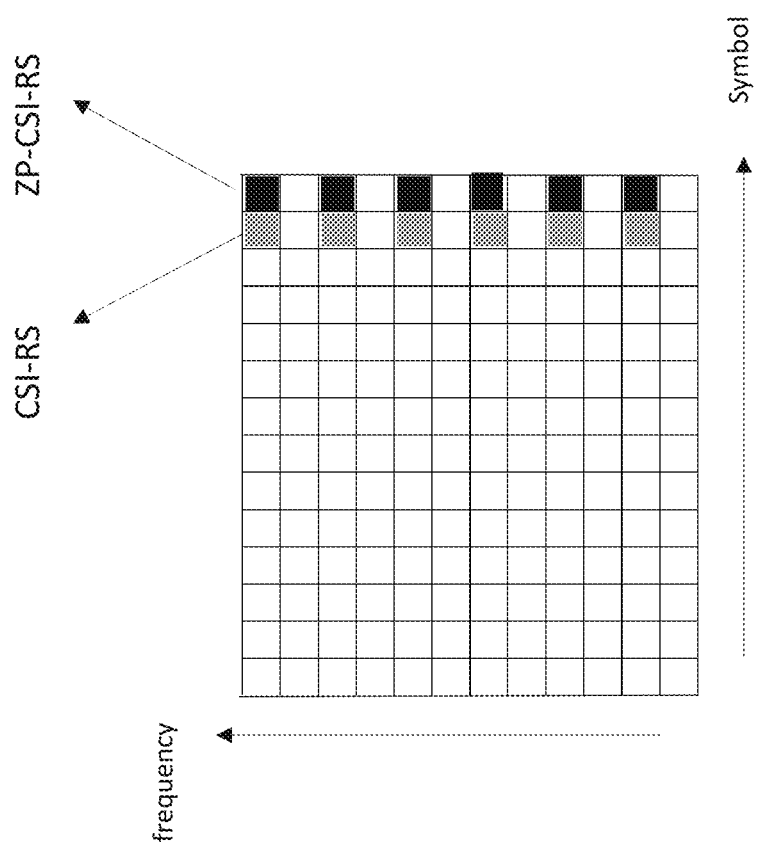
FIG. 3, showing further exemplary reference signaling.

FIG. 3 shows an exemplary corresponding arrangement of reference signaling. In some variants, two or more of the symbol time intervals (respectively adjacent resource elements) may carry reference signaling, for example a repetition of a modulation symbol, or a shifted version (in modulation/phase space) of the leading one.

Figure 4:
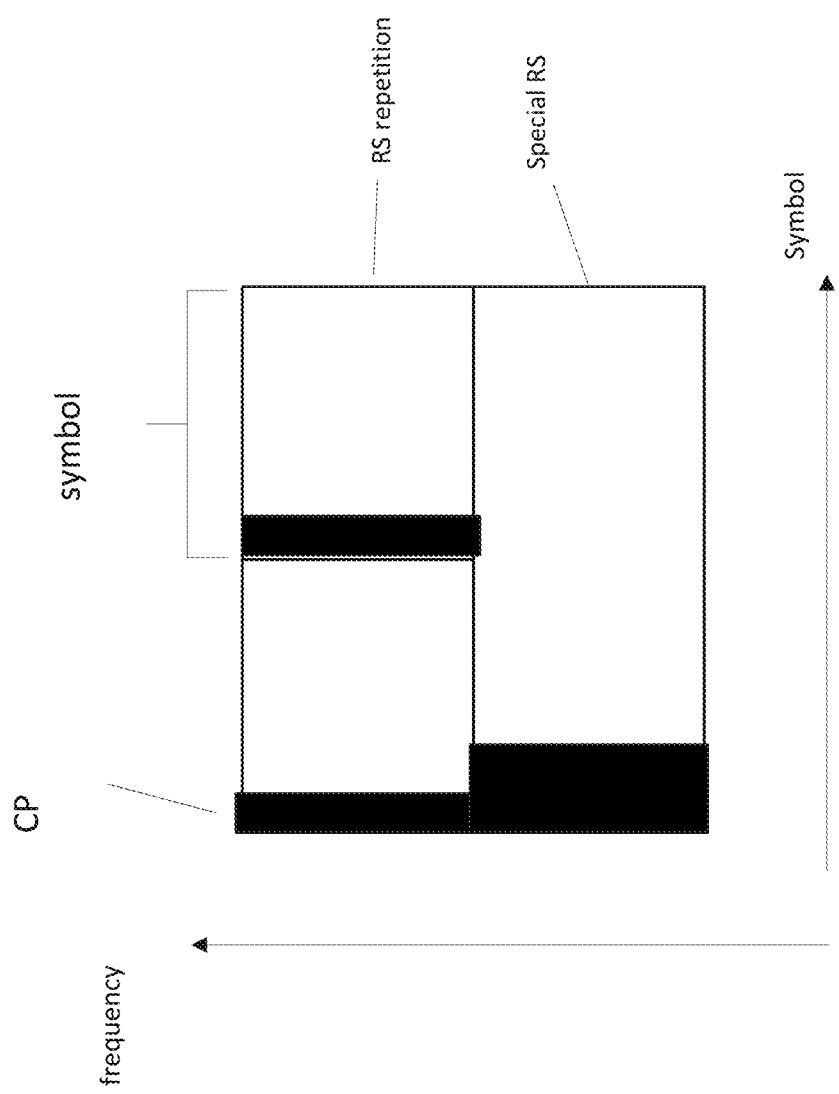
FIG. 4, showing further exemplary reference signaling.

FIG. 4 shows further alternatives examples of reference signaling. FIG. 4 shows two different versions of reference signaling covering two resource elements for the same subcarrier. In the upper row, the reference signaling comprises two modulation symbols on adjacent symbol time intervals. To each symbol, there is associated a leading cyclic prefix (indicated CP), to provide a CP/RS combination on each symbol time interval. Accordingly, the modulation symbol parts are separated by the CP of the second reference symbol. The modulation symbols may be copies of each other, or different. The lower row shows a different special structure for of reference signaling, in which a modulation symbol covers two symbol time intervals, with one prolonged CP leading, no other CP may be included in the structure. The prolonged CP may be an extended CP, and/or extend over double the time of the normal CP. The normal CP may be defined according to a standard and/or associated to the numerology. It may be considered that the prolonged CP corresponds to two concatenated CPs, and/or the RS (the modulation symbol) may correspond to two concatenated symbols and/or RS.

In general, a cyclic prefix may be determined based on the signaling structure of the symbol to be transmitted, e.g. repeating the tail of the signal. Variants with three or more symbol time intervals being covered may be considered, e.g. with three CP/RS combinations, or with one CP/RS combination with prolonged CP (which may correspond to two or three CPs) and one trailing RS covering the rest of the time interval covered by the three or more symbol time intervals.

It should be noted that reference signaling structures described for a subcarrier may be used analogously for all subcarriers used for reference signaling, e.g. with different modulation symbols, e.g. according to a configuration and/or sequence. The sequence may in general be an orthogonal sequence, e.g. a Gold or Zadoff-Chu sequence.

In general, the reference signaling structure may be adapted to cover the (expected) impulse response and/or delay spread distribution. Thus, the delay spread information may be considered to be precise.

Figure 5:
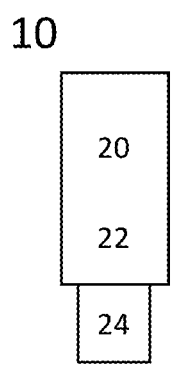
FIG. 5, showing an exemplary radio node.

FIG. 5 schematically shows a radio node, in particular a terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 6:
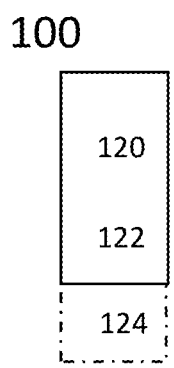
FIG. 6, showing another exemplary radio node.

FIG. 6 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Figure 7:
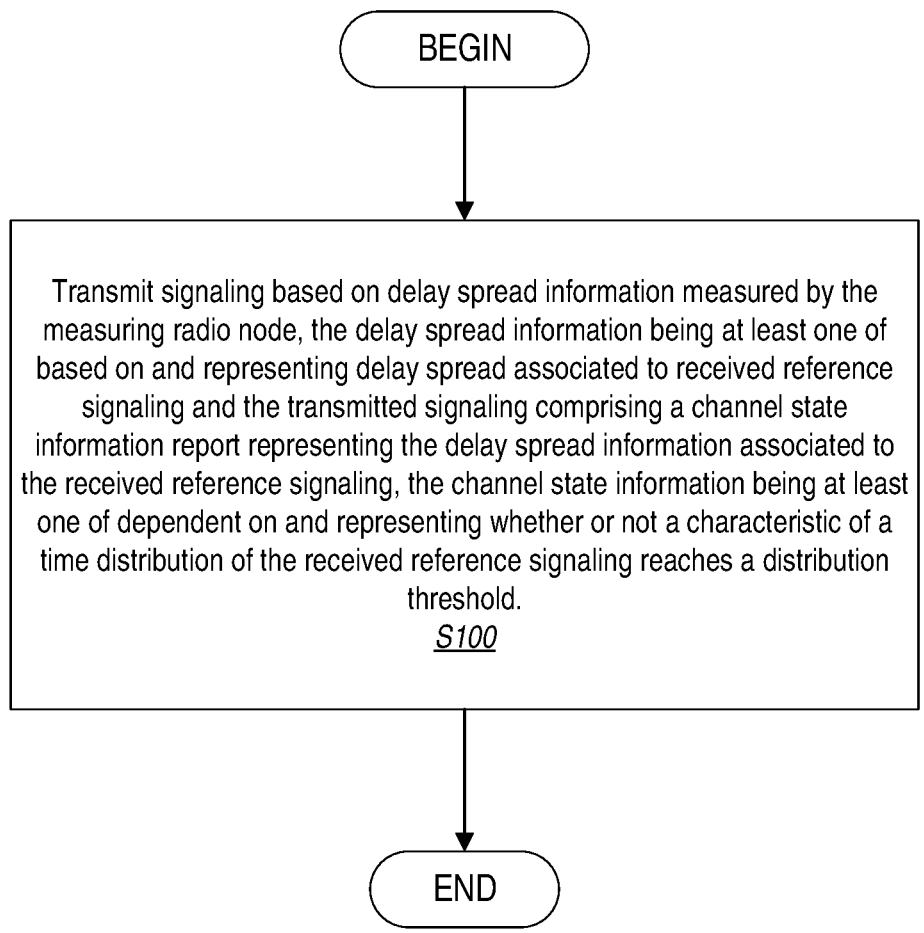
FIG. 7, showing a flowchart of an example process for operating a measuring radio node in a wireless communication network.

FIG. 7 is a flowchart of an example process for operating a measuring radio node in a wireless communication network. The measuring radio node 100 is configured to transmit signaling based on delay spread information measured by the measuring radio node (Block S100). The delay spread information is at least one of based on and representing delay spread associated to received reference signaling and the transmitted signaling comprises a channel state information report representing the delay spread information associated to the received reference signaling. The channel state information is at least one of dependent on and represents whether or not a characteristic of a time distribution of the received reference signaling reaches a distribution threshold.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronization signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network. Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than $4*pi$ sr ($4*pi$ correspond to a beam covering all directions), in particular smaller than $2*pi$, or $pi$, or $pi/2$, or $pi/4$ or $pi/8$ or $pi/16$. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beam forming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilize one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes. Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilizing, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, its transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

There are generally presented:

A1. Method of operating a measuring radio node (10, 100) in a wireless communication network, the method comprising
transmitting signaling based on delay spread information, the delay spread information being based on and/or representing delay spread associated to received reference signaling.

A2. Measuring radio node (10, 100) for a wireless communication network, the measuring radio node (10, 100) being adapted to transmit signaling based on delay spread information, the delay spread information being based on and/or representing delay spread associated to received reference signaling.

A3. Method of operating a radio node (10, 100) in a wireless communication network, the method comprising communicating with a measuring radio node (10, 100) based on a measurement report representing delay spread information received from the measuring radio node (10, 100).

A4. Radio node (10, 100) for a wireless communication network, the radio node (10, 100) being adapted to communicate with a measuring radio node (10, 100) based on a measurement report representing delay spread information received from the measuring radio node (10, 100).

A5. Method or device according to one of the preceding variants, wherein signaling transmitted based on delay spread information comprises a measurement report representing the delay spread information.

A6. Method or device according to one of the preceding variants, wherein a measurement report representing the delay spread information is a channel state information, CSI, report.

A7. Method or device according to one of the preceding variants, wherein delay spread information represents and/or indicates at least one of mean delay, and/or delay spread, and/or delay distribution, and/or delay spread distribution, and/or delay spread range, and/or relative delay spread, and/or energy distribution, and/or impulse response to received signaling, and/or power delay profile, and/or power delay profile associated metrics.

A8. Method or device according to one of the preceding variants, wherein a measurement report is dependent on, and/or represents, whether the delay spread reaches a delay threshold or not.

A9. Method or device according to one of the preceding variants, wherein a measurement report is dependent on, and/or represents, whether a characteristic of a time distribution of received signaling reaches a distribution threshold or not.

A10. Method or device according to one of the preceding variants, wherein the reference signaling covers two symbol time intervals.

A11. Method or device according to one of the preceding variants, wherein the measurement report pertains to a plurality of beams.

A12. Method or device according to one of the preceding variants, wherein the reference signaling comprises Channel State Information, CSI, reference signaling.

A13. Method or device according to one of the preceding variants, wherein the reference signaling comprises signaling with a prolonged cyclic prefix.

A14. Program product comprising instructions adapted for causing processing circuitry to control and/or perform a method according to one of variants A1, A3 or A5 to A13.

A15. Carrier medium arrangement carrying and/or storing a program product according to variant A14.

Some useful abbreviations comprise

| Abbreviation | Explanation |
|---|---|
| ACK/NACK | Acknowledgment/Negative Acknowledgement |
| ARQ | Automatic Repeat reQuest |
| BER | Bit Error Rate |
| BLER | Block Error Rate |
| CAZAC | Constant Amplitude Zero Cross Correlation |
| CB | Code Block |
| CBG | Code Block Group |
| CDM | Code Division Multiplex |
| CM | Cubic Metric |
| CORESET | Control Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| eMBB | enhanced Mobile BroadBand |
| FDD | Frequency Division Duplex |
| FDM | Frequency Division Multiplex |
| HARQ | Hybrid Automatic Repeat Request |
| IAB | Integrated Access and Backhaul |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RAN | Radio Access Network |
| RAT | Radio Access Technology |
| RB | Resource Block |
| RNTI | Radio Network Temporary Identifier |
| RRC | Radio Resource Control |
| SA | Scheduling Assignment |
| SC-FDE | Single Carrier Frequency Domain Equalization |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TB | Transport Block |
| TDD | Time Division Duplex |
| TDM | Time Division Multiplex |
| UCI | Uplink Control Information |

-continued

| Abbreviation | Explanation |
| --- | --- |
| UE | User Equipment |
| URLLC | Ultra Low Latency High Reliability Communication |
| VL-MIMO | Very-large multiple-input-multiple-output |
| ZF | Zero Forcing |
| ZP | Zero-Power, e.g. muted CSI-RS symbol |

Abbreviations may be considered to follow 3GPP usage if applicable.

What is claimed is:

1. A method of operating a measuring radio node in a wireless communication network, the method comprising:
    transmitting signaling based on delay spread information measured by the measuring radio node, the delay spread information being at least one of based on and representing delay spread associated to received reference signaling and the transmitted signaling comprising a channel state information report representing the delay spread information associated to the received reference signaling; and
    the channel state information being at least one of dependent on and represents whether or not a characteristic of a time distribution of the received reference signaling reaches a distribution threshold.

2. The method of claim 1, wherein delay spread information at least one of represents and indicates at least one from the group consisting of:
    mean delay;
    delay spread;
    delay distribution,
    delay spread distribution;
    delay spread range;
    relative delay spread;
    energy distribution;
    impulse response to received signaling.

3. The method of claim 1, wherein the measurement report is at least one of dependent on and represents, whether or not the delay spread reaches a delay threshold.

4. The method of claim 1, wherein the received reference signaling covers two symbol time intervals.

5. The method of claim 1, wherein the measurement report pertains to a plurality of beams.

6. The method of claim 1, wherein the received reference signaling comprises Channel State Information, CSI, reference signaling.

7. The method of claim 1, wherein the received reference signaling comprises signaling with a prolonged cyclic prefix.

8. A measuring radio node for a wireless communication network, the measuring radio node being configured to transmit signaling based on delay spread information measured by the measuring radio node, the delay spread information being at least one of based on and representing delay spread associated to received reference signaling and the transmitted signaling comprising a channel state information report based on the delay spread information associated to the received reference signaling, the channel state information being at least one of dependent on and represents whether or not a characteristic of a time distribution of the received reference signaling reaches a distribution threshold.

9. A method of operating a radio node in a wireless communication network, the method comprising communicating with a measuring radio node based on a channel state information report representing delay spread information measured by the measuring radio node associated to reference signaling received from the measuring radio node, the channel state information being at least one of dependent on and represents whether or not a characteristic of a time distribution of the received reference signaling reaches a distribution threshold.

10. A radio node for a wireless communication network, the radio node being configured to communicate with a measuring radio node based on a channel state information report representing delay spread information measured by the measuring radio node associated to reference signaling received from the measuring radio node, the channel state information being at least one of dependent on and represents whether or not a characteristic of a time distribution of the received reference signaling reaches a distribution threshold.

11. A non-transitory storage medium storing a program product comprising instructions adapted for causing processing circuitry to at least one of control and perform a method of operating a measuring radio node in a wireless communication network, the method comprising:
    transmitting signaling based on delay spread information measured by the measuring radio node, the delay spread information being based on and/or representing delay spread associated to received reference signaling, the transmitted signaling comprising a channel state information report representing the delay spread information associated to the received reference signaling; and
    the channel state information being at least one of dependent on and represents whether or not a characteristic of a time distribution of the received reference signaling reaches a distribution threshold.

* * * * *